United States Patent
Sakai

(10) Patent No.: US 7,872,829 B2
(45) Date of Patent: Jan. 18, 2011

(54) METHOD AND APPARATUS FOR OFFSET CONTROL IN A DISK DRIVE

(75) Inventor: Yuji Sakai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

(21) Appl. No.: 12/244,592

(22) Filed: Oct. 2, 2008

(65) Prior Publication Data

US 2009/0168224 A1   Jul. 2, 2009

(30) Foreign Application Priority Data

Dec. 27, 2007 (JP) ............................. 2007-337811

(51) Int. Cl.
*G11B 5/596* (2006.01)
(52) U.S. Cl. ............. 360/77.02; 360/77.04; 360/77.08; 360/78.04
(58) Field of Classification Search ................. None
See application file for complete search history.

(56) References Cited

U.S. PATENT DOCUMENTS

| 7,082,008 | B2 | 7/2006 | Ashikaga et al. |
| 7,265,930 | B2 * | 9/2007 | Nakamura et al. ............ 360/75 |
| RE40,955 | E * | 11/2009 | Le et al. .................. 360/77.08 |
| 2006/0139791 | A1 | 6/2006 | Date et al. |

FOREIGN PATENT DOCUMENTS

| JP | 11-126444 | 5/1999 |
| JP | 3198490 | 6/2001 |
| JP | 2001-243611 A | 9/2001 |
| JP | 2003-249044 A | 9/2003 |
| JP | 2004-342316 | 12/2004 |
| JP | 2005-166115 A | 6/2005 |
| JP | 2005-216378 | 8/2005 |
| JP | 2007-172733 | 7/2007 |
| JP | 2007-265530 A | 10/2007 |

OTHER PUBLICATIONS

Notice of Reasons For Rejection mailed by Japan Patent Office on Jun. 30, 2009 in the corresponding Japanese patent application No. 2008-304835.

* cited by examiner

*Primary Examiner*—Andrew L Sniezek
(74) *Attorney, Agent, or Firm*—Knobbe, Martens, Olson & Bear LLP

(57) ABSTRACT

According to one embodiment, there is provided a disk drive that can perform dynamic offset control (DOC). The disk drive has a magnetic head, a disk, and offset calculating modules. The magnetic head has read head. Offset-measuring position data is written in a non-servo area provided in the disk. The read head reads the offset-measuring position data from the disk. Based on the offset-measuring position data thus read, the offset calculating modules calculate an offset value that changes during a one-rotation period of the disk.

5 Claims, 9 Drawing Sheets

FIG. 2B  SRG-A  118
FIG. 2C  Servo data  120
FIG. 2D  SWG-1  117
FIG. 2E  SWG-2  121
FIG. 2F  Servo-record data  122
FIG. 2G  SRG-B  119
FIG. 2H  Servo data  120

METHOD AND APPARATUS FOR OFFSET CONTROL IN A DISK DRIVE

CROSS-REFERENCE TO RELATED APPLICATIONS

This application is based upon and claims the benefit of priority from Japanese Patent Application No. 2007-337811, filed Dec. 27, 2007, the entire contents of which are incorporated herein by reference.

BACKGROUND

1. Field

One embodiment of the present invention relates to a disk drive. More particularly, the invention relates to a technique of controlling the offset in a disk drive.

2. Description of the Related Art

Most disk drives, a representative example of which is the hard disk drive has a disk and a magnetic head. The disk is a magnetic recording medium. The magnetic head is configured to record and reproduce data in and from the disk. The magnetic head is mounted on a rotary-type actuator The magnetic head can be moved in the radial direction of the disk and positioned at a target track (or cylinder) provided on the disk.

The magnetic head has a read head and a write head, which are mounted on a slider (head main body) and spaced apart from each other. The read head is, for example, a GMR element, and is configured to read data recorded in the disk. The write head is configured to write data in the disk. Depending on the position the magnetic head assumes in the radial direction of the disk, an offset (positional deviation) develops between the track loci of the read head and the write head.

In order to move the magnetic head to a target position over the disk, an offset control is performed on both the read head and the write head to adjust the positions of the read head and write head in accordance with the offset. The offset control is performed based on the offset value that changes with the position the magnetic head takes in the radial direction of the disk. Note that the offset value remains the same as long as the magnetic head remains in the same track.

In the disk drive, a phenomenon called "disk runout" may develop if the spindle motor is secured at a wrong position. Once a disk runout has developed, the servo track deviates from the circular locus with respect to the rotation center of the disk. This results in a servo-track runout. Consequently, no accurate offset control can be performed on the magnetic head in the same track, because the offset value remains unchanged while the disk is rotating 360°.

To perform accurate offset control, a technique called "dynamic offset control (DOC) has been proposed (see, for example, Jpn. Pat. Appln. KOKAI Publications Nos. 2005-216378 and 2007-172733). The dynamic offset control is performed by changing the offset value in accordance with the disk runout value. Jpn. Pat. Appln. KOKAI Publication No. 2005-216378 discloses an offset control that uses first and second offset values. The first offset value changes with the position the head takes in the track in the radial direction of the disk. The second offset value is calculated, changing as the disk rotates 360°. On the other hand, Jpn. Pat. Appln KOKAI Publication No. 2007-172733 discloses a method that uses the first offset value identical to that described above, and monitors the second offset value that changes as the disk rotates 360°, directly on the basis of the error rate of data.

With regard to the dynamic offset control (DOC), a technique of measuring the disk runout has been proposed (see, for example, Jpn. Pat. Appln KOKAI Publication No. 11-126444 and Japanese Patent No. 3198490). More specifically, Jpn. Pat. Appln KOKAI Publication No. 11-126444 discloses a method in which the actuator holding a magnetic head is set at a specific position, the cylinder address information for one rotation of the disk from the servo sector, and the servo-track runout is measured from the cylinder address information. Japanese Patent No. 3198490 discloses a method of inferring a servo-track runout from a change in the time intervals of lock marks for one rotation of the disk.

As described above, due to the disk runout, the servo track that serves as the reference position for head positioning deviates from the circular locus with respect to the rotation center of the disk (resulting in a servo-track runout). This means that the read head positioned at the servo track changes in the radial direction of the disk as the disk rotates 360°. Therefore, the offset between the read head and the write head must be changed as the disk rotates once.

The servo-track runout occurs, mainly because the disk runout that develops when a servo-track writer records servo data in the disk, thereby forming servo tracks on the disk. Further, another disk runout develops when the disk with the servo data recorded on it is incorporated into the disk drive. The two disk runouts combine, resulting in a larger disk runout.

The above-identified prior-art publications propose a method of changing the offset value as the disk rotates 360°. In this regard, a method is employed, in which the offset value is calculated or inferred from the servo-track runout information and the sizes of the parts and mechanisms constituting the disk drive. However, the offset value calculated by this method is far from accurate. It is difficult for this method to provide an accurate setoff value, particularly because the sizes of the parts and mechanisms greatly vary from one disk drive to another. Moreover, when the disk drive receives an impact from outside, a disk shift occurs, inevitably changing the disk runout. It is therefore desirable to measure the offset value every time the magnetic head is loaded above the disk. Thus, the offset value must be measured frequently, requiring some time each time. This ultimately impairs the data-access ability of the disk drive.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 2A to 2H are diagrams explaining the timing of writing and reading a servo pattern for measuring the offset in the embodiment;

DETAILED DESCRIPTION

Various embodiments according to the invention will be described hereinafter with reference to the accompanying drawings. In general, according to one embodiment of the invention, there is provided a disk drive in which the offset value changing while the disk is rotating once can be directly measured, thus within a short time at high accuracy.

(Configuration of the Disk Drive)

Figure 1:
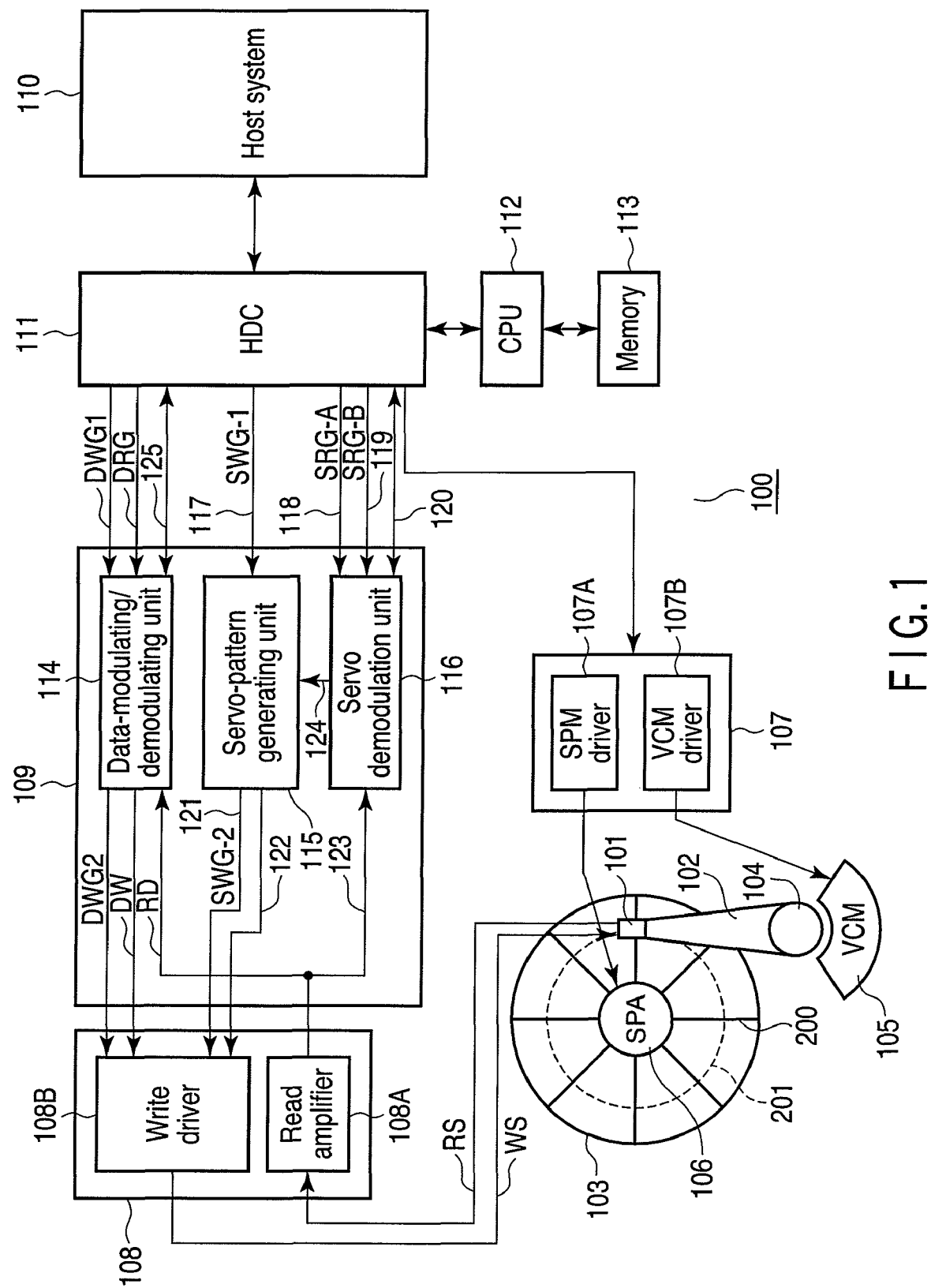
FIG. 1 is a block diagram explaining the configuration of a disk drive according to an embodiment of the present invention.

FIG. 1 is a block diagram explaining the configuration of a disk drive 100 according to the embodiment.

As FIG. 1 shows, the disk drive 100 according to the embodiment has an apparatus mechanism and a control/signal-processing system. The apparatus mechanism includes a magnetic head 101, a disk 103, a spindle motor (SPM) 106, and an actuator. The disk 103 is a magnetic recording medium. The SPM 106 can rotate the disk 103. The actuator holds the magnetic head 101 and can move the magnetic head 101 over the disk 101 in the radial direction thereof. The control/signal-processing system will be described later.

The magnetic head 101 includes a read head and a write head, both mounted on a slider. The read head is configured to read (reproduce) data and servo data from the disk 103. The write head is configured to write (record) data and a servo pattern for measuring an offset (i.e., position data for measuring the offset).

The actuator includes a suspension, an arm 102, a pivot 104, a coil, a magnet, a yoke, and a voice coil motor (VCM) 105. The suspension holds the magnetic head 101. The arm 102 can rotate around the pivot 104. The VCM 105 generates a force for rotating the arm 102. The actuator can move over the disk 103 in the radial direction of the disk 103 as a microprocessor (CPU) 112 (later described) performs head-positioning control (servo control). As the actuator so moves, the magnetic head 101 is moved to a target position (target track) on the disk 103.

A plurality of servo areas 200 are provided on the disk 103. The servo areas 200 extends in the radial direction of the disk 103 and spaced apart at regular intervals in the circumferential direction of the disk 103. Further, a number of concentric tracks (cylinders) 201 are provided on the disk 103. The tracks 201 are data tracks in which user data has been written by the write head. The tracks 201 are servo tracks, each including segments of servo areas 200.

In each servo area 200, an address code (cylinder code) and servo data are recorded. The address code identifies the track. The servo data contains servo-burst signals from which the position of the head 101 is detected. The CPU 112 uses the servo data read by the read head to perform the head-positioning control (servo control).

The control/signal-processing system has a motor driver 107, a head amplifier unit 108, a read/write channel 109, a hard disk controller (HDC) 111, a CPU 112, and a memory 113. The motor driver 107 has an SPM driver 107A and a VCM driver 107B. The SPM driver 107A supplies a drive current to the SPM 106. The VCM driver 107B supplies a drive current to the VCM 105.

The head amplifier unit 108 includes a read amplifier 108A and a write driver 108B. The read amplifier 108A amplifies a read signal SR read by the read head of the magnetic head 101 and outputs the read signal SR to the read/write channel 109. The write driver 108B receives write data WD from the read/write channel 109 and converts the same to a write signal (write current) WS. The write signal WS is supplied to the write head of the magnetic head 101. The write driver 108B converts the write data WD to a write signal WS at the timing of a write-gate signal DWG2 output from a data-modulating/demodulating unit 114.

The read/write channel 109 is a signal-processing unit that processes read signals and write signals. The read/write channel 109 has a data-modulating/demodulating unit 114, a servo-pattern generating unit 115, and a servo demodulation unit 116. The servo-pattern generating unit 115 generates a servo pattern for measuring an offset.

The data-modulating/demodulating unit 114 receives the record data 125 transferred from the HDC 111 at the timing of a write-gate signal DWG1 output from the HDC 111 and modulates (encodes) the same, generating write data WD. The unit 114 demodulates (decodes) a read-data signal RD receives a read-data signal RD output from the read amplifier 108A and demodulates (decodes) the same, generating reproduced data 125. The reproduced data 125 is output to the HDC 111.

The servo-pattern generating unit 115 generates servo-record data 122 at the timing of a servo-write gate signal 117 (SWG-1) output from the HDC 111. The servo-record data 122 contains a servo-gate signal 121 (SWG2) and an offset-measuring servo pattern (offset-measuring position data). At this point, the unit 115 receives a sync signal 124 from the servo demodulation unit 116.

The servo demodulation unit 116 receives a servo-reproducing signal 123 output from the read amplifier 10A. The servo demodulation unit 116 demodulates (decodes) this signal 123, generating servo data 120 that contains an address code and servo-burst signals (A to D). The servo data 120 is output to the HDC 111. The servo demodulation unit 116 demodulates the servo-burst signals (burst patterns A and B) at the timing of servo-read gate signal 118 (SRG-A) and servo-read gate signal 119 (SRG-B) output from the HDC 111.

The HDC 111 constitutes an interface between the disk drive 100 and a host system (personal computer or digital apparatus) 110. The HDC 111 controls the transfer of the user data (read data and write data) between the disk drive 100 and the host system 110. The HDC 111 controls the read/write operation of the read/write channel 109, too.

The CPU 112 is the main controller of the disk driver, or the main component of the servo system of the servo system that performs the head-positioning control (servo control). The CPU 112 performs not only the seek operation and tracking (position control) during the head-positioning control, but also a dynamic offset control (DOC) which characterized the embodiment.

The memory 113 includes a flash memory, a ROM, and a RAM. The memory 113 stores various data items that the CPU 112 uses to perform controls.

Advantages of the Embodiment

The advantages of the embodiment will be explained with reference to FIGS. 2A to 2H and FIGS. 3 to 11. FIGS. 2A to 2H are diagrams explaining the timing of writing, and the timing of reading, servo patterns 142 and 143 for measuring the offset (i.e., offset-measuring position data items).

Figure 7:
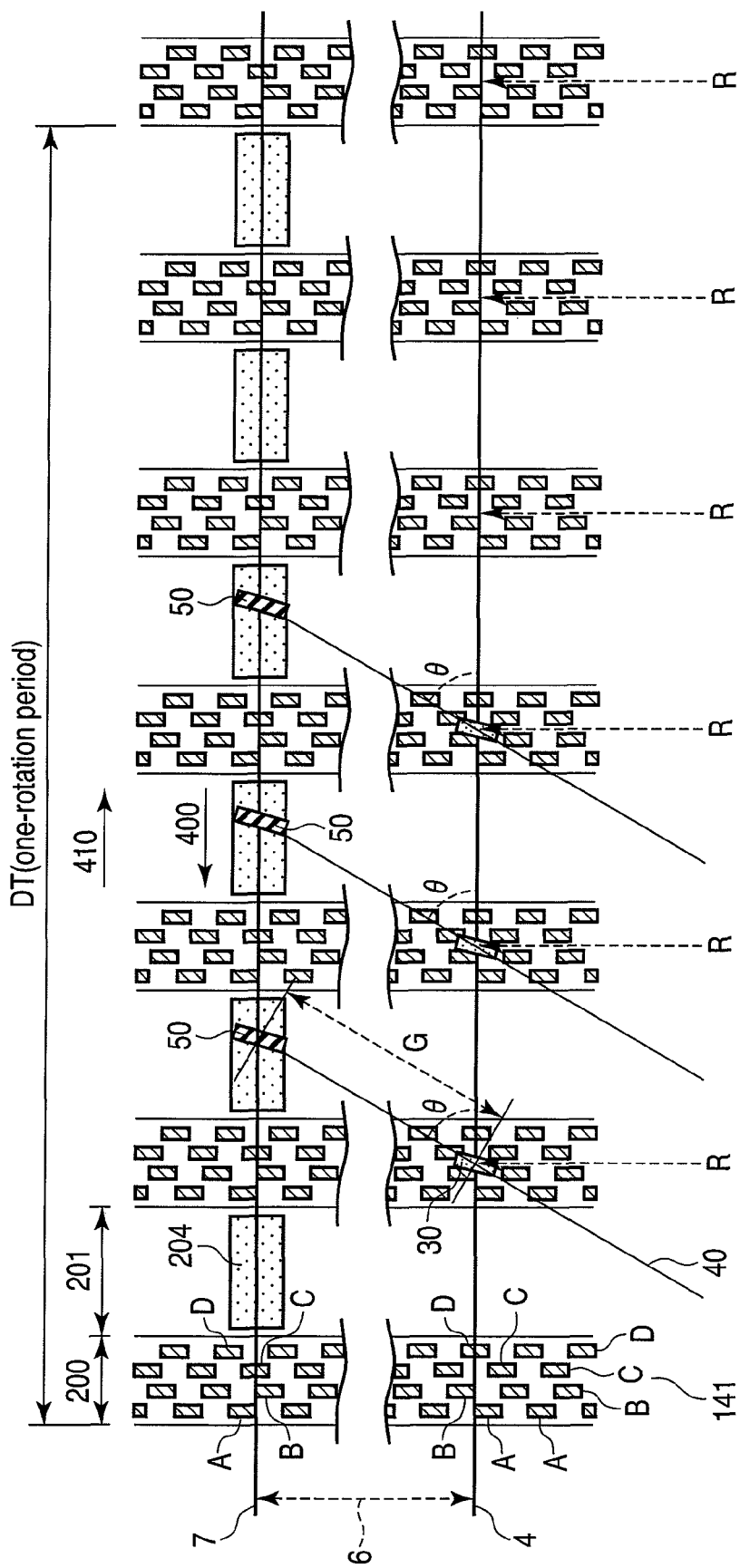
FIG. 7 is a diagram explaining an offset measured when no disk runouts develop in the embodiment.

First, the offset, which exists between the read head and write head of the magnetic head 101 if any disk runout (servo-track runout) has not developed, will be explained with reference to FIG. 7. In FIG. 7, reference number 400 denotes the direction in which the magnetic head 101 moves, and reference numeral 410 indicates the direction in which eth disk 103 rotates.

In the disk drive 100, the CPU 112 controls the position of the magnetic head 112 as described above, in accordance with the servo data recorded in the servo areas 200 provided on the disk 103. In FIG. 7, only servo-burst signals A to D, i.e., accurate position data 141, for the sake of convenience. In fact, however, sync signals, servo address data (track address codes), and the like are recorded in the servo areas 200.

In the head-positioning control, the read head 30 is positioned at the centerline of the servo track so that the components of a reproduced signal, which correspond to the servo-burst signals A and B, may have the same amplitude. That is, the read head 30 is located over the servo track 4 that is identical to the locus of the gap center of the read head 30. Here, the centerline of the servo track is defined as servo track 4 or 7, for convenience.

As seen from FIG. 7, the radius R of the servo track 4 as measured from the rotation center of the disk remains unchanged for a one-rotation period DT during which the disk rotates 360°. This means that if the servo track 4 does not deviate from the circular locus with respect to the rotation center of the disk, a servo-track runout (disk runout) does not develop at all.

As shown in FIG. 7, the servo track 7, which is identical to the locus of the gap center of the write head 50, remains at a distance (i.e., read/write offset) 6 from the servo track 4 that is the positioning locus of the read head 30, for the one-rotation period DT during which the disk rotates once. Thus, if the radius that the servo track 4 has with respect to the read head 30 remains constant for the one-rotation period DT, the skew angle θ, which is an angle defined by the servo track 4 and the line connecting the gap center of the read head 30 and that of the write head 50. Hence, the offset 6 can be calculated, using the following equation:

Offset 6=inter-gap distance G×sin θ=constant

FIG. 7 is based on the assumption that the magnetic head 101 is an in-line type and that the gap center of the read head 30 therefore lies on line 40 connecting the gap center of the write head 50 and the pivot 104 around which the actuator holding the magnetic head 101 rotates. Therefore, when the write head 50 writes data, it forms a data track 204 in the servo track 7 provided in the track 201 (data area). To read the data, the read head 30 is adjusted in position by specific offset 6. So positioned over the servo track 7, the read head 30 starts reading data.

Figure 8:
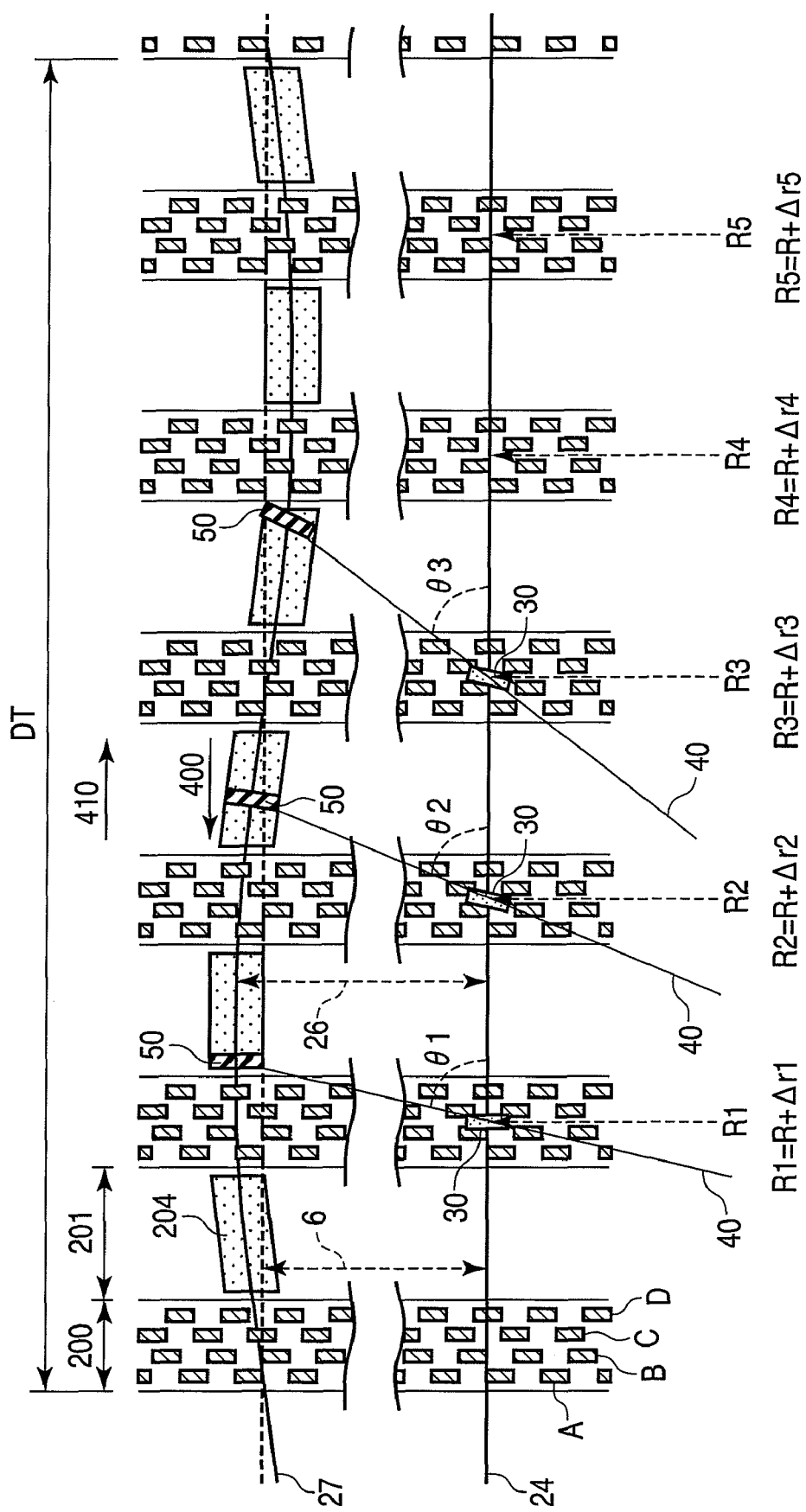
FIG. 8 is a diagram explaining an offset measured when a disk runout develop in the embodiment.

The offset will be further described, with reference to FIG. 8, in the case where a disk runout (servo-track runout) develops in the disk drive 100.

The read head 30 is positioned at the centerline of a servo track 24 so that the components of a reproduced signal, which correspond to the servo-burst signals A and B, may have the same amplitude. That is, the read head 30 is located over the servo track 24 that is the locus of the gap center of the read head 30 has a servo-track runout. That is, the radius of the servo track 24, which is the distance from the center of rotation of the disk to the servo track 24, changes during the one-rotation period DT (from R1 to R5).

Such a servo-track runout (disk runout) usually develops in most disk drives. The servo data is recorded in the servo areas 200 provided on the disk 103 during the manufacture of the disk drive by a servo-track writer (STW) that is dedicated to servo-data writing. During the manufacture of the disk drive it is difficult to align the center of the servo track with the rotation center of the disk 103, because the center of the disk 103 deviates from the rotation axis of the SPM 106.

As shown in FIG. 8, the radius of the servo track 24 changes (from R1 to R5) with respect to the read head 30 during the one-rotation period DT. The skew angle θ, defined by the servo track 24 and the line connecting the gap center of the read head 30 and that of the write head 50, therefore changes during the one-rotation period DT. Hence, the offset 26 changes during the one-rotation period DT. The offset 26 is the distance from the servo track 24, i.e., locus of the gap center of the read head 30, to the gap center of the write head 50.

In this case, an error will develop with respect to a data-write locus 27 if the offset control (position control) is performed on the read head 30, moving the read head 30 from the servo track 24 to another servo track (indicated by the broken line) located at a specific distance from the servo track 24.

In the disk drive 100 according to the embodiment, servo patterns 142 and 143 for measuring the offset (i.e., offset-measuring position data items) are written in a specified region of the non-servo area 205 provided on the disk 193 in addition to the servo areas 200, as shown in FIGS. 2A to 2H and FIG. 9. The servo patterns 142 and 143 for measuring the offset may be reproduced, and the offset value that changes during the one-rotation period may be calculated from the servo patterns 142 and 143 reproduced.

The timing of writing and reading the servo patterns 142 and 143 for measuring the offset will be explained with reference to FIGS. 2A to 2H.

Note that the servo patterns 142 and 143 for measuring the offset are burst signals (M and N) equivalent to the burst signals A to D that are accurate position data contained in ordinary servo data.

Figure 2A:
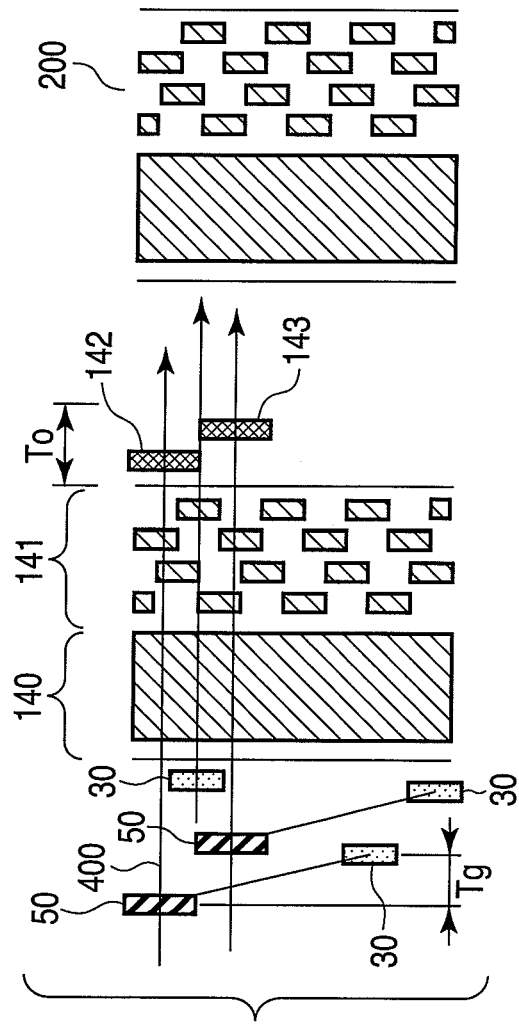
Figure 2A:
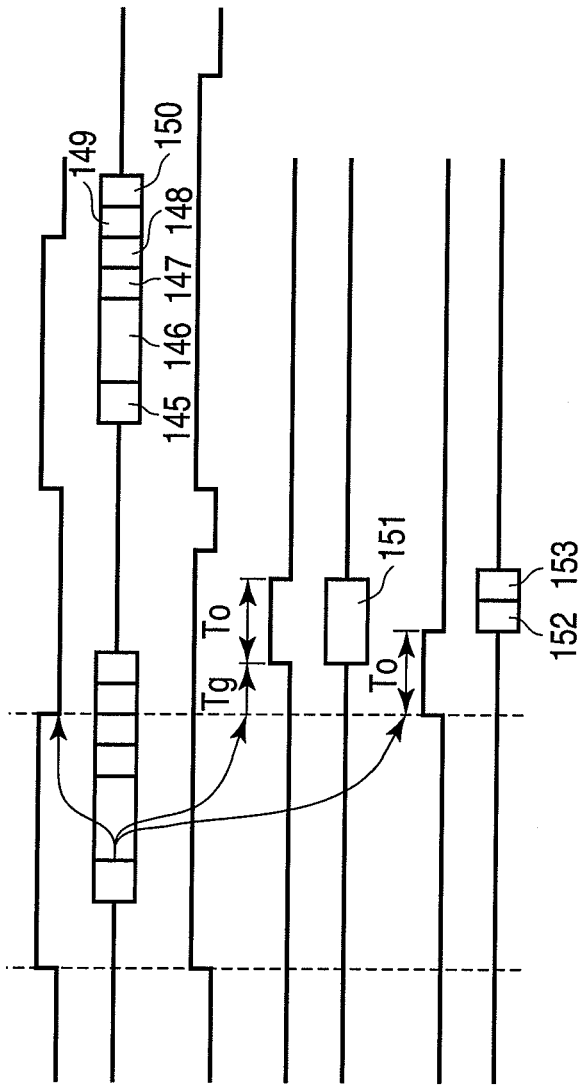

At the timing of the servo-read gate signal 118 (SRG-A) output from the HDC 111, the read/write channel 109 demodulates the servo data 120 read by the read head 30 from the servo area 200, as illustrated in FIG. 2B. As shown in FIG. 2A, the servo area 200 includes two region 140 and 141. In the region 140, sync signal 145 and servo-address data 146 (track-address code and sector-address code) are recorded. In the region 141, servo-burst signals A to D are recorded. As shown in FIG. 4C, the servo data 120 demodulated contains sync signal 145, servo-address data 146, and servo-burst signals A to D (147 to 149).

As shown in FIGS. 2D, 2E and 2F, the servo-pattern generating unit 115 generates servo-record data 122 at the timing of the servo-write gate signal 117 (SWG-1) output from the HDC 111. The servo-record data 122 contains a servo-gate signal 121 (SWG2) and an offset-measuring servo pattern (offset-measuring position data).

The write driver 108B receives the servo-record data 122 outputs from the servo-pattern generating unit 115 and converts the same to a servo-data signal 151. The servo-data signal 151 is supplied to the write head 50. More precisely, the write driver 108B supplies the servo-data signal 151 to the write head 50 at the timing of the servo-gate signal 121 (SWG2). Thus, as FIG. 2A shows, the servo patterns 142 and 143 for measuring the offset can be recorded outside the servo area 200, for example in a specified region of the non-servo area 205 that is adjacent to the servo area 200.

As shown in FIGS. 2G and 2H, the servo demodulation unit 116 demodulates the servo data 120 read by the read head 30, at the timing of the servo-read gate signal 119 (SRG-B) output from the HDC 111. The servo demodulation unit 116 therefore generates burst signals 152 and 153 that correspond to the servo patterns 142 and 143, respectively.

The servo patterns 142 and 143 for measuring the offset, recorded in the specified region of the non-servo area 205, are thus reproduced by the method described above. A method of calculating an offset value (i.e., offset 26 shown in FIG. 8) that changes during the one-rotation period of the disk will be explained in detail with reference to FIG. 9.

Figure 9:
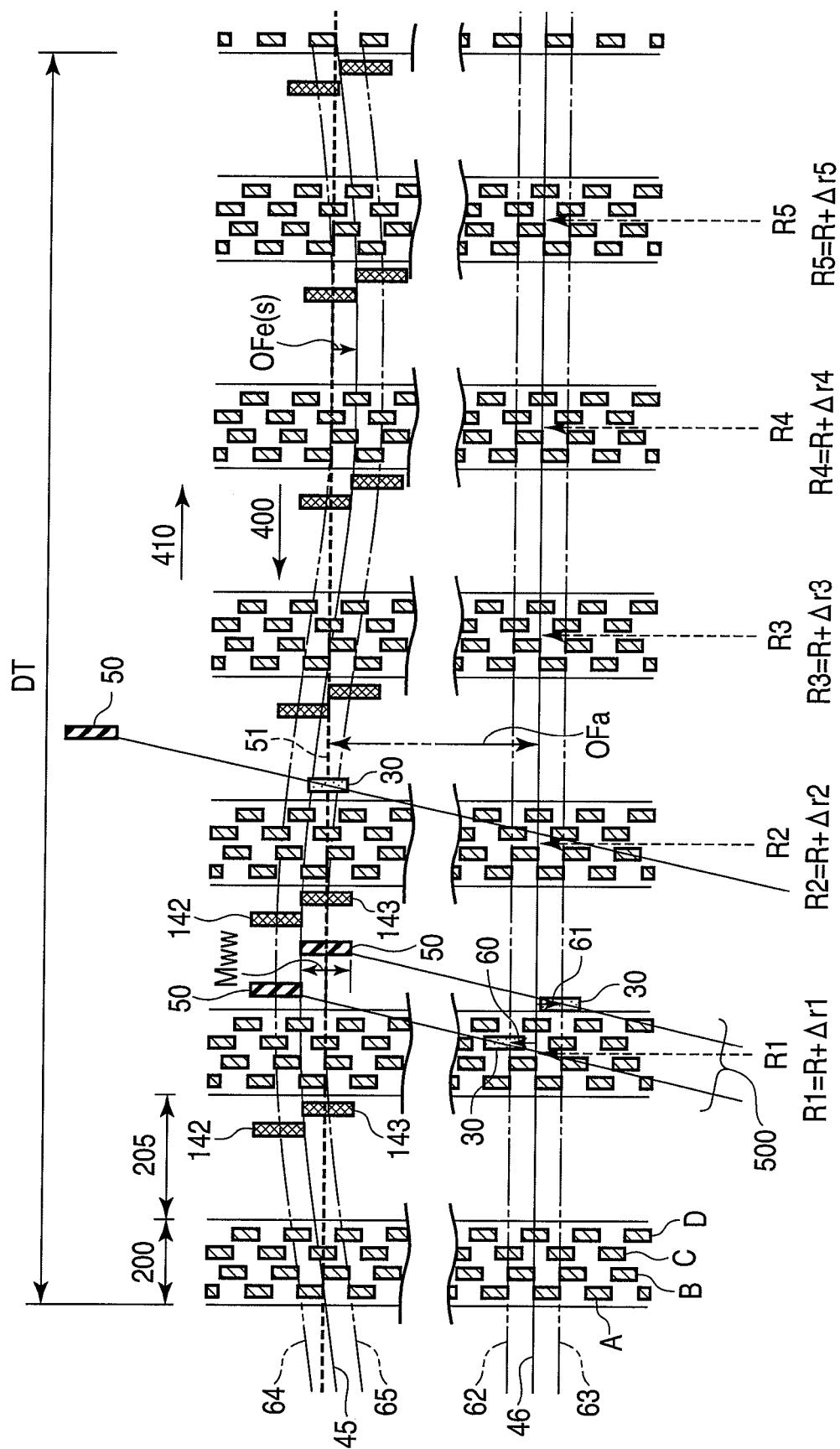
FIG. 9 is a diagram explaining how to calculate an offset value in the embodiment.

As described above, the CPU 112 uses the servo-pattern generating unit 115, ultimately self-servo writing the servo patterns 142 and 143 for measuring the offset, on the locus (write-head locus 45) of the write head 50 that is equivalent to the data-track locus. That is, the servo patterns 142 and 143 equivalent to burst signals A and B are recorded in the specified region of the non-servo area 205, which lies outside the servo area 200 provided on the disk 103. In FIG. 9, reference number 500 denotes the position that the read head 30 and write head 50 assume when they perform self-servo writing.

Next, the CPU 112 moves the read head 30 by an offset distance OFa calculated beforehand, aligning the read head 30 with the read-head locus 51. Thus moved, the read head 30 reads the servo patterns 142 and 143 for measuring the offset. The CPU 112 causes the HDC 111 to acquire the position-error data about the read head 30, in accordance with the servo patterns 142 and 143 for measuring the offset. The CPU 112 therefore directly monitors the offset value between the read head 30 and the write head 50 during the one-rotation period DT.

The CPU 112 controls the position of the read head 30 so that the components of the reproduced signal, which correspond to the servo-burst signals A and B, may have the same amplitude. At this point, as shown in FIG. 9, the read head 30 and the write had 50 lie right above the right-head locus 46 and the write-head locus 45, respectively.

Then, the read head 30 is set off by about half (½) the recording width Mww of the write head 50 (by offset value 61 from read-head locus 63). At this time, a burst signal 143 is written by means of self-servo writing, in synchronism with the servo data in the servo area 200 (write-head locus 65).

The read head 30 is further set off by about half (½) the recording width Mww of the write head 50 (by offset value 60 from read-head locus 62), writing a burst signal 142 in the non-servo area 205. At this time, the burst signal 142 is written by means of self-servo writing, in synchronism with the servo data in the servo area 200 (write-head locus 64).

The CPU 112 sets off the read head 30 by a prescribed distance, i.e., offset OFa, and acquires position-error data OFe(s) from the burst signals 142 and 143 self-servo written, at the timing represented by the servo data recorded in the servo area 200. Note "(s)" is the value by which the offset value changes during the one-rotation period. The position-error data OFe(s) is equal to the offset error. The CPU 112 calculates the offset value OF(s), using the following equation:

$$OF(s)=OFa+OFe(s)$$

Figure 10:
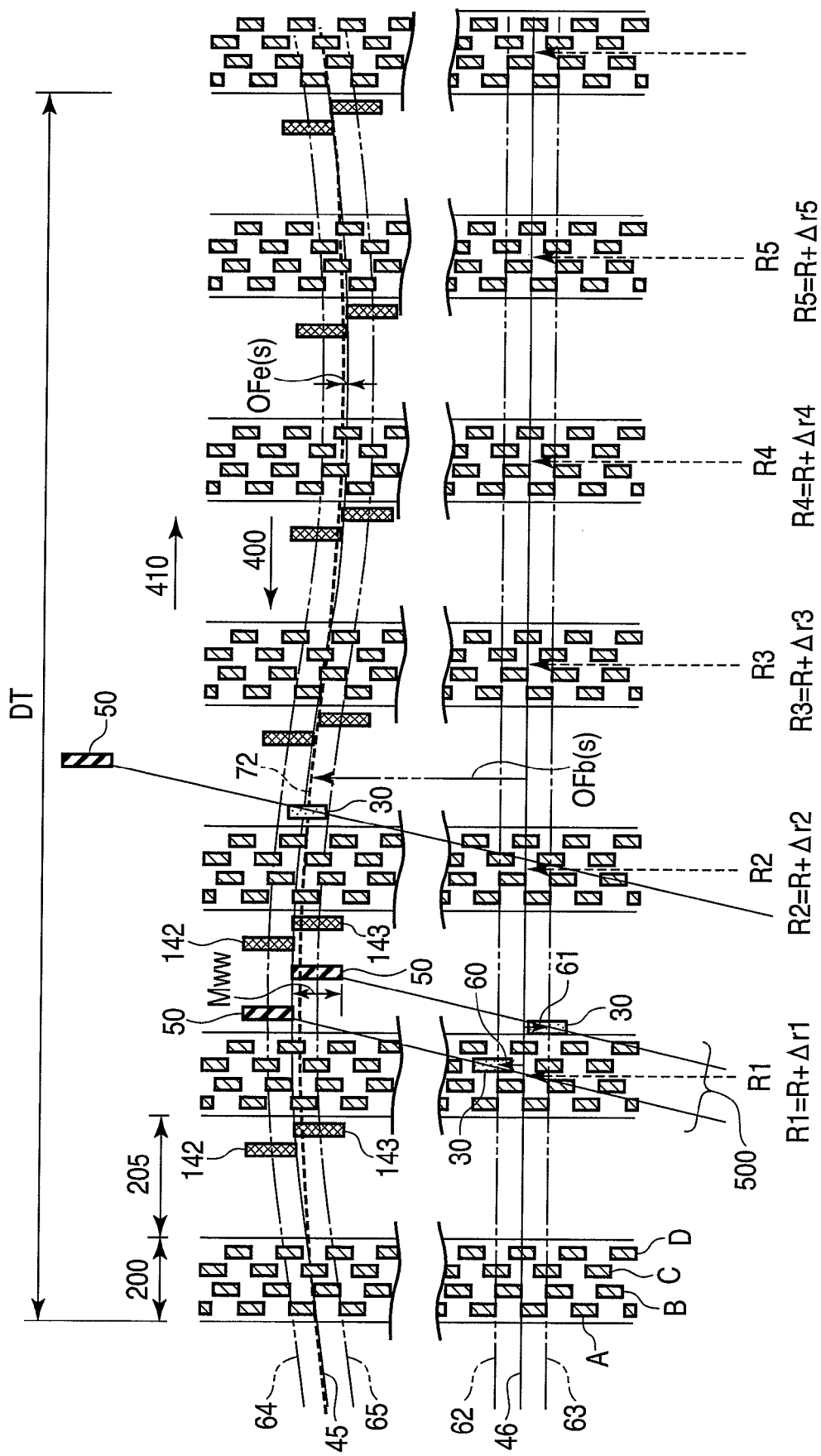
FIG. 10 is a diagram explaining a first modification of the method of calculating an offset value in the embodiment.

FIG. 10 is a diagram explaining a first modification of the method of calculating an offset value that changes during the one-rotation period, in the embodiment.

In the first modified method, too, the servo patterns for measuring the offset are written from the burst signals 142 and 143, in the non-servo area 205 by means of self-servo writing, in the same manner as in the embodiment shown in FIG. 9.

In the first modified method, the read head 30 is controlled in position (adjusting the position to the read-head locus 72) by using the offset value OFb(s) that changes during the one-rotation period. The CPU 112 calculates the position-error data OFe(s) from the burst signals 142 and 143 read by the read head 30. In this case, the offset OF(s) between the read head 30 and the write head 50, which changes during the one-rotation period, is calculated, using the following equation:

$$OF(s)=OFb(s)+OFe(s)$$

Figure 11:
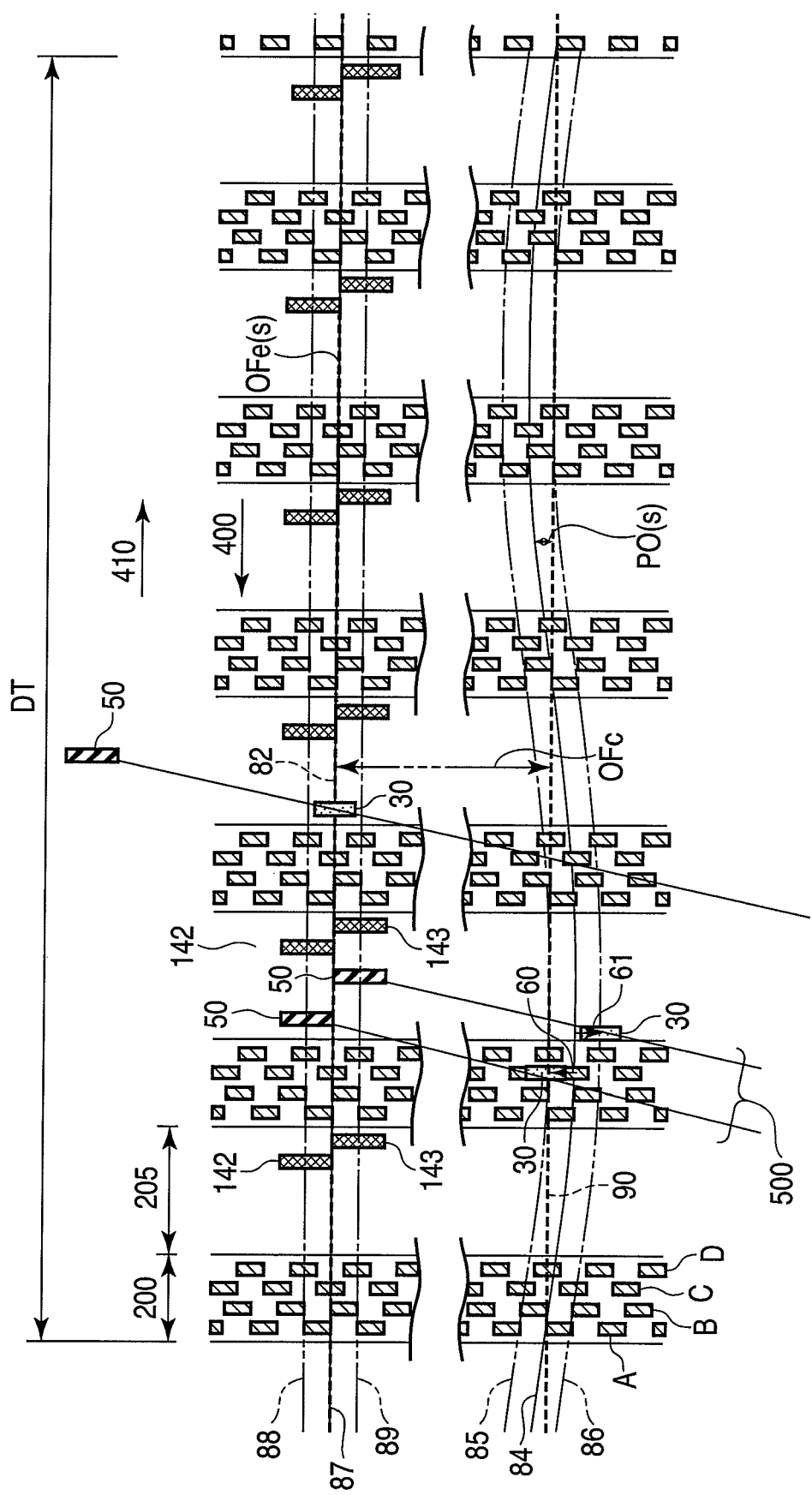
FIG. 11 is a diagram explaining a second modification of the method of calculating an offset value in the embodiment.

FIG. 11 is a diagram explaining a second modification of the method of calculating an offset value in the embodiment.

In the second modified method, the CPU 112 adjusts the position of the read head 30 with respect to the servo track (i.e., read-head locus 90 indicated by the broken line) so that the components of the reproduced signal, which correspond to the servo-burst signals A and B, may have the same amplitude. At this point, the position change PO(s) is used, which is the difference between a locus 84 and a locus 90. The read head 30 is thereby set to about half (½) the recording width Mww of the write head 50 (by offset value 61 from read-head locus 86). Then, the CPU 112 causes the write head 50, which is now on a write-head locus 89, to write the burst signal 143 by means of self-servo writing. Similarly, the CPU 112 sets off the read head 30 by the same value as described above (by offset value 60 from the read-head locus 85), and causes the write head 50, which is now on a write-head locus 88, to perform self-servo writing, thus writing the burst signal 142.

Next, the read head 30 is set off with respect to the read-head locus 90 by a prescribed offset OFc (distance). The CPU 112 calculates the position-error data OFe(s) from the burst signals 142 and 143 that the read head 30 have read. In this case, the offset OF(s) between the read head 30 and the write head 50, which changes during the one-rotation period, is calculated, using the following equation:

$$OF(s)=PO(s)+OFc(s)+OFe(s)$$

(Recording Areas of Servo Patterns for Measuring the Offset)

Figure 3:
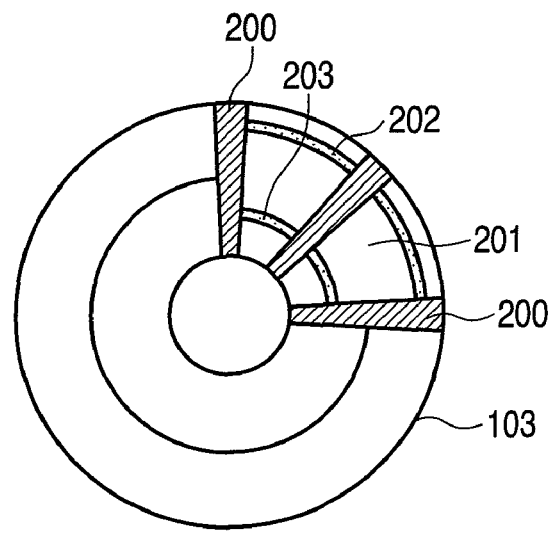
FIG. 3 is a diagram explaining recording areas in which to record the servo patterns for measuring an offset in the embodiment.
Figure 4:
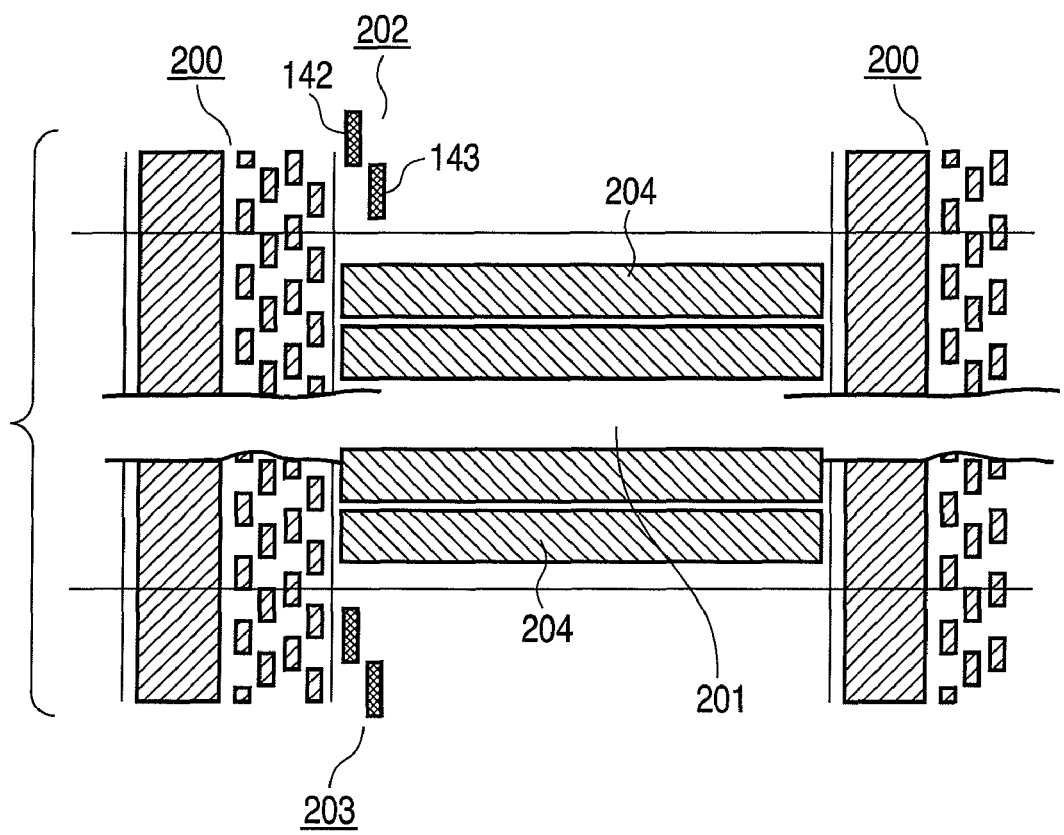
FIG. 4 is another diagram explaining the recording areas in which to record the servo patterns for measuring the offset in the embodiment.

FIG. 3 and FIG. 4 are diagrams explaining recording areas in which to record the servo patterns 142 and 143 for measuring an offset in the embodiment.

In the embodiment, the recording areas for the servo patterns 142 and 143 are, respectively, the outermost track of the disk 103 and the innermost track of the disk 103. In other words, they are one-track areas 202 and 203, in and from which no user data is recorded and reproduced. Alternatively, the recording areas for the servo patterns 142 and 143 may be two outermost one-track areas 202 and 203 or two innermost one-track areas 202 and 203. The latter alternative case is preferable.

The offset value OF(s) between the read head 30 and the write head 50 is measured by using the burst signals 142 and 143 read from the innermost one-track area 202 and the outermost one-track area 203, respectively. In this case, the offset value in the data area 201 is offset value OF2(s) that has been corrected through theoretical calculation based on the sizes of the mechanism-system components. To calculate the offset value OF2(s), the offset acquired at the innermost track or the outermost track is used. Alternatively, both offsets acquired at the innermost and outermost tracks may be used to calculate the offset value OF2(s).

Figure 5:
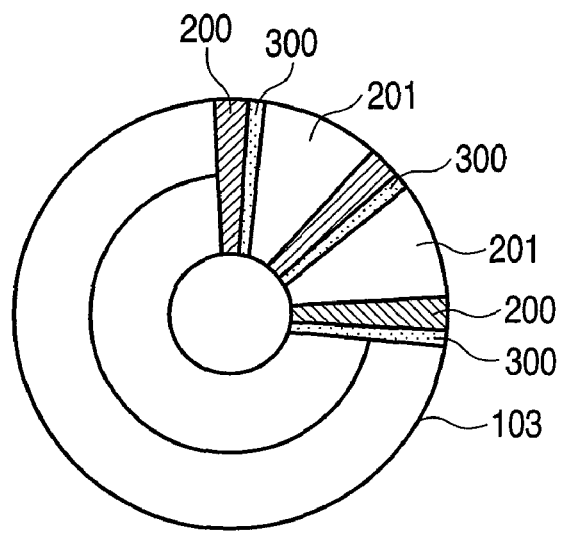
FIG. 5 is a diagram explaining a modified recording area in which to record the servo pattern for measuring the offset in the embodiment.
Figure 6:
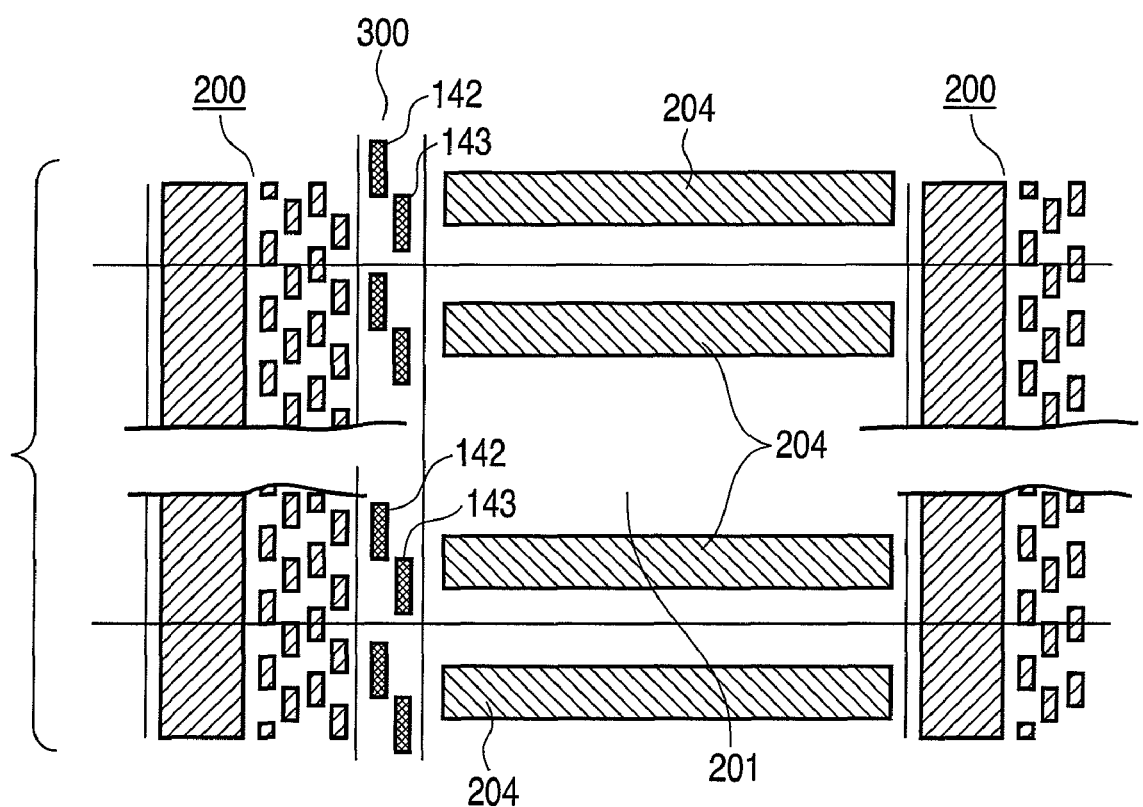
FIG. 6 is another diagram explaining the modified recording area in which to record the servo pattern for measuring the offset in the embodiment.

FIG. 5 and FIG. 6 are diagrams explaining modified recording areas in which to record the servo patterns 142 and 143 for measuring the offset in the embodiment. In the modification, recording areas 300 for recording the servo patterns 142 and 143 are provide, each between a servo area 200 and a data area 201 as shown in FIG. 5. No user data is recorded in, and reproduced from, the recording areas 300.

As has been described, the present embodiment can directly calculate the offset between the read head and the write head, which changes during the one-rotation period of the disk. Therefore, the offset value that changes during the one-rotation period can be accurately calculated within a short time. This is practically useful, not impairing the data-access ability of the disk drive 100 that performs dynamic offset control (DOC). Further, it suffices to provide, for example, only about two tracks on the disk 103, as specified region in which to record the servo patterns for measuring the offset (i.e., offset-measuring position data). Therefore, the track density will not decrease.

In summary, the offset between the read head and the write head can be directly measured in the embodiment. Therefore, the offset value that changes during the one-rotation period of the disk can be accurately calculated within a short time. This invention can therefore provide a practically useful disk drive that can reliably perform DOC function, without impairing the data-access ability.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
a disk comprising a servo area in which servo data is recorded;
a magnetic head comprising a write head and a read head spaced apart from each other, defining an predetermined offset, the write head configured to write data in the disk, and the read head configured to read data from the disk;
a head-position control module configured to position the magnetic head at a target position over the disk, in accordance with the servo data read from the disk by the read head; and
an offset calculating module configured to write offset-measuring position data for measuring an offset value between the read head and the write head in a movement locus of the write head, corresponding to a locus of a data track, on a predetermined region of the disk other than the servo area, and configured to calculate the offset value that changes during a one-rotation period of the disk, from the offset-measuring position data read by the read head,
wherein the predetermined region of the disk, in which to write the offset-measuring position data, is at least one-track region in the innermost or outermost track provided on the disk, the data in which no user data is recorded, and from which no user data is reproduced, and
wherein the offset calculating module is configured to calculate the offset value that changes during the one-rotation period of the disk, from the offset-measuring position data reproduced from the at least one-track region in the innermost or outermost track, and to calculate a correction offset value based on the sizes of mechanism-system components provided in the disk drive as the offset value which changes during the one-rotation period of the disk and which is used for positioning the magnetic head in a data area provided on the disk in which to record user data.

2. The disk drive of claim 1, wherein the offset-measuring position data comprises burst signals equivalent to servo-burst signals in the servo data, and the offset calculating module is configured to adjust the position of the read head by a distance equivalent to the predetermined offset, to calculate the position error of the read head as an offset error from the offset-measuring position data read by the read head, to add the predetermined offset to the offset error, and thus to calculate the offset value that changes during the one-rotation period of the disk.

3. The disk drive of claim 1, wherein the offset-measuring position data comprises burst signals equivalent to servo-burst signals in the servo data, and the offset calculating module is configured to adjust the position of the read head by a distance equivalent to the change that the offset value undergoes during a one-rotation period of the disk, to calculate the position error of the read head as an offset error from the offset-measuring position data read by the read head, to add the predetermined offset to the offset error, and thus to calculate the offset value that changes during the one-rotation period of the disk.

4. The disk drive of claim 1, wherein the offset-measuring position data comprises burst signals equivalent to servo-burst signals in the servo data, and the offset calculating module is configured to move the position of the write head by a distance equivalent to the change that the offset value undergoes during a one-rotation period of the disk and writes the offset-measuring position data, to adjust the position of the read head by the predetermined offset, to calculate the position error of the read head as an offset error from the offset-measuring position data read by the read head, to add the position change of the write head and the predetermined offset and to the offset error, and thus to calculate the offset value that changes during the one-rotation period of the disk.

5. The disk drive of claim 1, wherein the predetermined region of the disk for writing the offset-measuring position data is a region between the servo area and a user-data area provided on the disk, no user data is recorded in the predetermined area, and no user data is reproduced from the predetermined area.

* * * * *